United States Patent Office 3,454,622
Patented July 8, 1969

3,454,622
URETHANOHALOHYDRINS
Charles H. Schramm, Easton, Pa., and Claude J. Schmidle, Hudson, Ohio, assignors to J. T. Baker Chemical Company, Phillipsburg, N.J., a corporation of New Jersey
No Drawing. Continuation-in-part of application Ser. No. 274,922, Apr. 23, 1963. This application Dec. 20, 1965, Ser. No. 515,150
Int. Cl. C07c *125/04*
U.S. Cl. 260—471                    20 Claims This application is a continuation-in-part of our copending application Ser. No. 274,922, filed on Apr. 23, 1963, now abandoned.

This invention relates to a class of urethanohalohydrin compounds and to a method for their preparation. In a particular aspect this invention relates to novel poly(beta-haloalkylurethano)halohydrins which are useful as monomers in the production of resins, and as intermediates in the synthesis of other useful derivatives such as epoxy compounds. The synthesis of epoxy compounds and resins derived therefrom are more fully disclosed in our application Ser. No. 515,149 filed concurrently herewith.

The class of poly(beta-haloalkylurethano) halohydrin compounds contemplated by the present invention can be conveniently produced by a process which comprises reacting a polyisocyanate with a poly (halohydrin) in quantities providing between about 1.1 and 4.0 halohydrin groups per isocyanato group.

The term "polyisocyanate" refers to compounds containing two or more isocyanato (—NCO) groups.

The term "halohydrin" refers to compounds containing one or more halohydrin groups

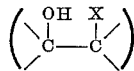

wherein X is halogen.

The term "poly(beta-haloalkylurethano) halohydrin" refers to compounds containing two or more halohydrin groups

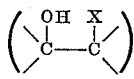

wherein X is halogen and two or more beta-haloalkylurethano radicals.

The term "beta-haloalkylurethano" refers to the

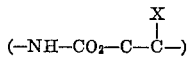

radical wherein X is halogen.

Illustrative of the above described process is the interaction of hexamethylene diisocyanate with 2,3-dichloro-1,4-butanediol:

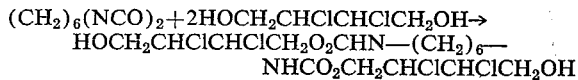

In addition to carbon, hydrogen, oxygen, sulfur, nitrogen, and halogen atoms, the compounds of the present invention can contain silicon, titanium, phosphorus, and the like.

Polyisocyanate reactants suitable for use in the production of the present invention poly(beta-haloalkylurethano) halohydrin compounds include isocyanato compounds and prepolymers which are being developed for commercially important polyurethane chemistry. Polyisothiocyanates are also suitable reactants in place of the polyisocyanates. Among the preferred polyisocyanantes and polyisothiocyanates are those corresponding to the formula:

wherein G is oxygen or sulfur, x is an integer of two or more and R is an alkylene, substituted alkylene, arylene or substituted arylene radical, a hydrocarbon or substituted hydrocarbon containing one or more aryl —NCG bonds and one or more alkyl —NCG bonds. R can also include radicals such as —RZR— where Z can be a divalent moiety such as —O—, —O—R—O—, —CO—, —CO$_2$—, —S—, —S—R—S—, —SO$_2$—, and the like. Examples of such compounds include hexamethylene diisocyanate, xylylene diisocyanates, (OCNCH$_2$CH$_2$—CH$_2$OCH$_2$)$_2$, 1-methyl-2,4-diisocyanatocyclohexane, phenylene diisocyanates, tolylene diisocyanates, chlorophenylene diisocyanates, polyhalophenylene diisocyanates, diphenylmethane-4,4'-diisocyanate, naphthalene-1,5-diisocyanate, triphenylmethane-4,4',4''-triisocyanate, xylene-α,α'-diisothiocyanate, and isopropyl-benzene-α,4-diisocyanate.

Further included are dimers and trimers of isocynates, isothiocyanates, diisothiocyanates, and diisocyanates and polymeric diisocyanates and diisothiocyanates of the general formula:

$$(RNCG)_x \text{ and } [R(NCG)_x]_y$$

in which x and y are two or more, as well as compounds of the general formula:

$$M(NCG)_x$$

in which x is two or more and M is a monofunctional or polyfunctional atom or group. Examples of this type include ethylphosphonic diisocyanate, C$_2$H$_5$P(O)(NCO)$_2$; phenylphosphonic diisocyanate, C$_6$H$_5$PO(NCO)$_2$; compounds containing a ≡Si—NCG group, isocyanates derived from sulfonamides, R(SO$_2$NCO)$_x$, and the like.

A particularly useful mixture of polyisocyanates are the products obtainable by phosgenation of the reaction products of aniline and formaldehyde as expressed by the following general formula:

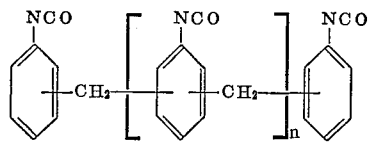

wherein n=0 to 10.

Poly(halohydrin) reactants suitable for use in the invention process are essentially unlimited, and the particular poly(halohydrin) selected will depend on cost, availability, reactivity, the properties of the products sought to be produced, and other practical and theoretical considerations.

The preferred poly(halohydrin) reactants will generally correspond to the structure:

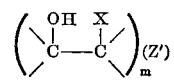

wherein m is an integer between 2 and 5, X is halogen, and Z' is a polyvalent organic radical selected from aliphatic and aromatic structures such as alkylene, oxyalkylene, substituted alkylene, cycloalkylene, substituted cycloalkylene, arylene, substituted arylene, aryleneoxy, aralkylene, substituted aralkylene, and the like, and Z' can also be zero, i.e., Z' can be a covalent bond directly connecting to halohydrin moieties. X is preferably chlorine or bromine.

Poly(halohydrin) compounds are readily produced by hydrohalogenation of the corresponding polyepoxide compounds. For example, treatment of divinylbenzene dioxide with hydrogen chloride yields the corresponding poly(halohydrin) structure:

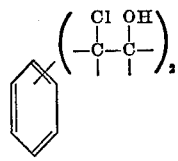

Useful poly(halohydrin) compounds include 1,4-dichloro-butanediol-2,3, 1,4-dibromobutanediol-2,3, 2,3-dichlorobutanediol-1,4, 2,3-dibromobutanediol-1,4, vinylcyclohexene dichlorohydrin, 3,3'-dichloro-2,2'-dihydroxydipropylether, epichlorohydrin adducts of polyols and polyhydric phenols including 1,2-ethylene-dioxy-bis-(3-chloro-2-propanol), 1,4 - butylenedioxy-bis-(3-chloro-2-propanol), and the like, and the corresponding epichlorohydrin adducts of other such polyols such as polyethylene glycol, polypropylene glycol, polybutylene glycol, mixtures of such poly(oxyalkylene) glycols, resorcinol, glycerol, pentaerythritol, sorbitol, polyvinyl alcohol, and the like.

Other useful poly(halohydrin) compounds are the halohydrin compounds which correspond to polyepoxides (wherein each oxirane group is instead a halohydrin group) such as aliphatic polyol epoxycyclohexanecarboxylates exemplified by compounds which include 3-methyl - 1,5 - pentanediol bis (3,4-epoxycyclohexanecarboxylate), 1,5-pentanediol bis (3,4-epoxycyclohexanecarboxylate), 2-methoxy-methyl-2,4-dimethyl - 1,5 - pentanediol bis (3,4-epoxycyclohexanecarboxylate), ethylene glycol bis (3,4-epoxycyclohexanecarboxylate), 2,2-diethyl-1,3-propanediol bis (3,4-epoxycyclohexanecarboxylate), 1,6-hexanediol bis (3,4-epoxycyclohexanecarboxylate), 2-butene-1,4-diol bis (3,4-epoxycyclohexanecarboxylate), 2-butene-1,4-diol bis (3,4-epoxy-6-methylcyclohexane carboxylate), 1,1,1-trimethylolpropane tris (3,4-epoxycyclohexanecarboxylate), 1,2,3-propanetriol tris (3,4-epoxycyclohexanecarboxylate), 1,2,3-propanetriol tris (3,4-epoxycyclohexanecarboxylate); oxyalkylene glycol epoxycyclohexanecarboxylates exemplified by compounds which include dipropylene glycol bis (2-ethylhexyl 4,5-epoxycyclohexane-1,2-dicarboxylate), diethylene glycol bis (3,4-epoxy-6-methylcyclo-hexanecarboxylate), triethylene glycol bis (3,4-epoxycyclohexanecarboxylate); epoxycyclohexylalkyl epoxycyclohexanecarboxylates exemplified by compounds which include 3,4-epoxycyclohexylmethyl-3,4-epoxycyclohexanecarboxylate, 3,4 - epoxy-1-methylcyclohexylmethyl 3,4 - epoxy-1-methylcyclohexanecarboxylate, 3,4-epoxy-2-methylcyclohexyl-methyl 3,4-epoxy-2-methyl-cyclohexanecarboxylate, (1 - chloro-3,4-epoxycyclohexan-1 - yl)methyl 1-chloro-3,4-epoxycyclohexanecarboxylate, (1-bromo-3,4-epoxycyclohexan-1-yl)methyl 1-bromo-3,4-epoxycyclohexanecarboxylate, (1 - chloro-2-methyl-4,5-epoxycyclohexan-1-yl(methyl 1 - chloro-2-methyl-4,5-epoxycyclohexanecarboxylate; epoxycyclohexylalkyl dicarboxylates exemplified by compounds which include bis (3,4-epoxycyclohexylmethyl) pimelate, bis (3,4-epoxy-6-methylcyclohexylmethyl) maleate, bis (3,4-epoxy-6-methylcyclohexylmethyl) succinate, bis (3,4-epoxycyclohexylmethyl) oxalate, bis (3,4-epoxy-6-methylcyclohexylmethyl sebacate, bis (3,4-epoxy-6-methylcyclohexylmethyl) adipate; epoxycyclohexylalkyl phenylenedicarboxylates exemplified by compounds which include bis (3,4-epoxycyclohexylmethyl) terephthalate, bis (3,4-epoxy-6-methylcyclohexylmethyl) terephthlate; epoxycyclohexylalkyl oxyalkylene glycol ethers exemplified by compounds which include bis (3,4-epoxy-6-methylcyclohexylmethyl) diethylene glycol ether; sulfonyldialkanol bis (epoxycyclohexanecarboxylates) exemplified by compounds which include 2,2'-sulfonyldiethanol bis (3,4-epoxycyclohexanecarboxylate); epoxycyclohexane-1,2-dicarboximides exemplified by compounds which include N,N'-ethylene bis (4,5-epoxycyclohexane-1,2 - dicarboximide); epoxycyclohexylalkyl carbamates exemplified by compounds which include di(3,4-epoxycyclohexylmethyl) 1,3-tolylenedicarbamate; epoxycyclohexylalkyl acetals exemplified by compounds which include bis (3,4-epoxy-6-methylcyclohexylmethyl) 3,4 - epoxy-6-methylcyclohexanecarboxaldehyde acetal; and epoxycyclohexyl-substituted spirobi (metadioxane) derivatives exemplified by compounds which include 3,9 - bis (3,4 - epoxycyclohexyl)spirobi(metadioxane). Other poly(halohydrin) compounds can be employed which correspond to polyepoxide derivatives such as 3,4 - epoxy - 6 - methylcyclohexylmethyl 9,10 - epoxystearate, 1,2-bis (2,3-epoxy-2-methylpropoxy)ethane, the diglycidyl ether of 2,2-(p-hydroxylphenyl)propane, butadienedioxide, dicyclopentadiene dioxide, pentaerythritol tetrakis (3,4-epoxycyclohexanecarboxylate), divinylbenzene, dioxide, and the like. A preferred class of poly(halohydrin) reactants are those which can be represented by the formula:

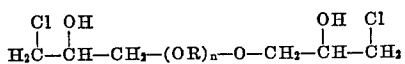

wherein R is straight or branched chain alkylene having from 2 to 4 carbon atoms, e.g. propylene, and $n$ represents repeating units of the (OR) group. Such poly(halohydrins) can be prepared by the reaction of 2 moles of epichlorohydrin with one mole of a poly(oxyalkylene) glycol having from 2 to 4 carbon atoms in the presence of a catalyst such as boron trifluoride etherate. The molecular weight of the poly(oxyalkylene) glycols can vary over a wide range such as that of from about 100 to 4,000 and preferably from about 150 to 1,000. Another preferred class of poly(halohydrin) reactant is poly(epichlorohydrin).

The useful poly(halohydrin) reactants also include those prepared by halohydrination of polyunsaturated compounds which contain two or more olefinically unsaturated groups reactive to hypohalite addition reactions.

Illustrative of a preferred class of poly(beta-haloalkylurethano) halohydrin compounds of the present invention is the general formula

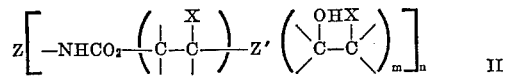

wherein Z is a polyvalent organic radical selected from aliphatic and aromatic structures such as alkylene, substituted alkylene, alkyleneoxy, alkenylene, substituted alkenylene, arylene, substituted arylene, and the like; Z' is a polyvalent organic radical selected from aliphatic and aromatic structures such as alkylene, substituted alkylene, alkyleneoxy, cycloalkylene, substituted cycloalkylene, arylene, substituted arylene, aryleneoxy, aralkylene, substituted aralkylene, and the like, and Z' can also be zero, i.e., Z' can be a covalent bond directly connecting two halohydrin moieties; X is halogen, preferably chlorine or bromine; $m$ is an integer between 1 and 5, and $n$ is an integer between 2 and 10. In another aspect of this invention, the compounds can contain a single halohydrin and a single beta-alkylurethano group, i.e., in the above general formula, $m$ and $n$ are each equal to one. This class of (beta-haloalkylurethano) halohydrin compounds can be produced by reacting a monoisocyanate compound with a di(halohydrin) compound in quantities providing between about 1.1 and 4.0 halohydrin groups per isocyanato group.

The particularly preferred compounds corresponding to the above general formula for the poly(beta-haloalkylurethano) halohydrin compounds are those having a molecular weight up to about 5,000 and higher.

Within the above illustrated class of poly(beta-haloalkylurethano) halohydrin compounds, those represented by the following formula are particularly preferred:

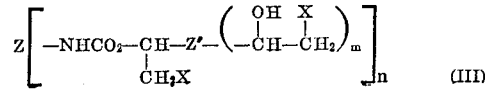
(III)

wherein Z, X, Z′, m and n have the same meaning given in the above illustrated formula for the poly(beta-haloalkylurethano) halohydrin compounds. Preferably Z is tolylene or another divalent hydrocarbon group having from about 6 to 12 carbon atoms, e.g. alkylene, alkphenylene, phenylene, etc.; X is chlorine or bromine and particularly chlorine; m is 1; n is 2; and Z′ is selected from groups consisting of alkylene, e.g. methylene, ethylene, propylene, etc.; chlorosubstituted alkylene, e.g. divalent chloroethylene; and alkyleneoxy, e.g. methyleneoxy, ethyleneoxy, propyleneoxy, and the like. Illustrative of a Z′ group is the organic residue of a dihalohydrin prepared by reacting epichlorohydrin with a poly(oxyalkylene) glycol having from 2 to 4 carbon atoms in each oxyalkylene group. Preferably the epichlorohydrin is reacted with the poly(oxyalkylene) glycol in a molar ratio of 2 moles of epichlorohydrin per mole of poly(oxyalkylene) glycol. This organic residue can be represented by the formula:

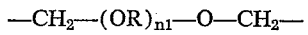

wherein R is alkylene of 2 to 4 carbon atoms and $n^1$ represents repeating units of the (OR) group.

The process producing the invention (beta-haloalkylurethano) halohydrin compounds can be conducted at a temperature between about 0° C. and 150° C. with the preferred temperature in the usual case being between about 15° C. and 120° C. Where one or both of the reactants is liquid, there is no need to use a solvent medium although it is generally more convenient to employ a solvent. Any solvent medium can be employed which is inert to the reactants and has the proper solubility characteristics. Suitable solvents include hydrocarbons such as benzene, xylene, toluene, hexane, heptane, octane, cyclohexane, and various terpenes; oxygenated solvents such as acetone, methylisobutylketone, cyclohexanone, ethyl acetate, butyl acetate, amyl acetate, dioxane, tetrahydrofuran, dibutyl ether, and the like; and other common solvents such as carbon tetrachloride, carbon disulfide, and the like.

As mentioned hereinabove, the poly(halohydrin) and polyisocyanate reactants are employed in quantities between about 1.1 and 4.0 halohydrin groups per isocyanato group. Preferably the reactants are used in quantities providing between about 1.5 to 2.5 halohydrin groups per isocyanato group.

The reaction between the poly(halohydrin) and isocyanate reactants proceeds more efficiently when a catalyst is employed. Suitable catalysts include those which are known and used in the polyurethane art, but which will not become involved in any desirable side reactions with the halogen groups present in the invention compounds. Illustrative of useful catalysts are arsenic trichloride, antimony trichloride, titanium tetrachloride, biscyclopentadienyltitanium difluoride, dioctyl lead dichloride, dimethyl tin diacetate, dibutyl dilaurate, diphenyl tin dichloride, butyl tin trichloride, dimethyl tin oxide, methylstannoic acid, stannous laurate, stannous octoate, triethylenediamine, N-methylmorpholine, triethanolamine, and the like.

The catalyst, when used, is employed in a quantity up to about 5 weight percent based on the weight of the isocyanate.

The invention (beta-haloalkylurethano) halohydrin compounds can be recovered from the invention process by precipitating from the reaction medium with a solvent in which the product is not soluble, or the original solvent medium can be removed by distillation. It is generally more convenient not to recover the product but to proceed with the next reaction step where the present invention (beta-haloalkylurethano) halohydrin compounds are being used as an intermediate. For example, as described in Example 1, the reaction mixture recovered from the invention process can be treated with a suitable quantity of acid acceptor reagent such as sodium hydroxide and the poly(beta-haloalkylurethano)-halohydrin material is transferred into the corresponding polyepoxyalkyl derivative, i.e., each of the residual halohydrin groups is dehydrohalogenated to produce the corresponding epoxy group. The dehydrohalogenation reaction is readily accomplished by treating (beta-haloalkylurethano) halohydrin with an inorganic or organic acid acceptor such as alkali metal hydroxides and carbonates, ion exchange resins, pyridine, amines, and the like.

For example, the dehydrohalogenation can be accomplished by heating the (beta-haloalkylurethano) halohydrin with aqueous potassium hydroxide at a temperature between 5° C. and 150° C. for a period from about five minutes to about four hours, or by heating the product mixture with pyridine either in aqueous medium or an organic solvent medium.

It is to be noted that during the dehydrohalogenation reaction in which the epoxy groups are formed, there is also formed 2-oxazolidinone (also referred to as 2-oxazolidone) moieties. Hence the present invention compositions can be dehydrohalogenated to form a novel class of epoxyoxazolidinone (also referred to as epoxyoxazolidone) derivatives. These compounds in turn can be cured with epoxy curing catalysts or reacted with epoxy hardeners to yield a broad variety of valuable polymers which range in properties from those which resemble polyurethane resins to those which are more closely similar to commercial polyepoxide resins.

The (beta-haloalkylurethano) halohydrins of this invention are generally liquids. They have good stability, long shelf life and low vapor pressure. In addition to the uses mentioned hereinbefore for these novel compounds, they can be used in fire retardant formulations, e.g. with antimony trioxide, and added to normally combustible material, e.g. poly(vinyl chloride) and other combustible resins. Additionally, they can add flexibility when formulated with resins, e.g. 10% of the novel compounds in poly(vinyl chloride) or polypropylene.

The following examples will serve to illustrate specific embodiments of the present invention.

EXAMPLE 1

Poly(epichlorohydrin) (95 grams) having an average molecular weight of 450 was mixed with dioxane (180 grams) and 2,4-tolylene diisocyanate (17.4 grams). Stannous octoate (0.4 milliliter) was added and the mixture was stirred and kept at 25 to 30° C. overnight. The reaction mixture was added dropwise, with efficient agitation, to 240 grams of 10 percent sodium hydroxide solution at 70 to 75° C. and was allowed to stir for one hour. Four hundred grams of water was added and the lower (organic) layer was separated, dissolved in toluene, and washed with water. The toluene solution was dried over anhydrous sodium sulfate, filtered, and concentrated in vacuo to yield an epoxyoxazolidinone having a viscosity of 24,000 cps. at 25° C. (Brookfield). The product contained 2.05 percent oxirane oxygen.

EXAMPLE 2

A mixture of 38 grams of tolylene diisocyanate (80/20—2,4/2,6-isomers) and 200 grams of polypropylene glycol having an average molecular weight of 2,000 was heated and maintained at 120 to 130° C. for three hours with stirring. It was then cooled to 25° C. and a solution of 95 grams isopropylidene bis [1-(p-phenyleneoxy)-3-chloro-2-propanol] in 95 grams of methylene chloride was added. The mixture was stirred, 0.3 milliliter of stannous octoate added, and allowed to stand overnight. It was then added, over the course of one hour, to 500 grams of 10 percent aqueous sodium hydroxide solution with efficient stirring at 80 to 90° C. The mixture was stirred for thirty minutes after the addition was completed. The resulting viscous, resinous product was washed with water and dried.

The resinous product was divided into portions and cured using various organic anhydride and amine hardeners.

CURING CONDITIONS (ANHYDRIDES)

| Hardener | Gms. per 100 gms. resin [1] | Cure Schedule |
|---|---|---|
| Hexahydrophthalic anhydride | 19 | 100° C./8 hrs.—Tough, rubbery polymer. |
| Methylnadic anhydride | 22 | Do. |
| Dodecenylsuccinic anhydride | 50 | 100° C./8 hrs.—Soft, rubbery polymer. |

[1] Plus 1 percent dimethylbenzylamine accelerator.

CURING CONDITIONS (AMINES)

| Hardener | Gms. per 100 gms. resin [1] | Cure Schedule |
|---|---|---|
| Diethylenetriamine | 5 | 30–35° C./8 hrs.—Elastic polymer. |
| Shell Curing Agent U [1] | 20 | 30–35° C./8 hrs.—Tough, elastic polymer. |
| Shell Curing Agent D [2] | 20 | 100° C./8 hrs.—Flexible polymer. |

[1] Liquid tertiary amine salt. [2] Liquid amine.

Two grams of Shell Curing Agent U was thoroughly mixed with 10 grams of the resin of Example 4. The resulting mixture increased in viscosity as the mixing was continued and was drawn into the form of a continuous fiber. This was allowed to cure at 35° C. for eight hours. A tough, elastic fiber was obtained.

EXAMPLE 3

Tolylene diisocyanate (17 grams) was mixed with 85 grams of methylene chloride and 85 grams of isopropylidene bis [1-(p-phenyleneoxy)-3-chloro-2-propanol]. The mixture was stirred until a homogeneous solution was obtained and 0.4 milliliter of stannous octoate was added. Cooling was required to maintain the temperature below 35° C. The mixture was allowed to stand overnight at 25 to 30° C. It was then added, over a period of one hour, to 600 grams of 10 percent aqueous sodium hydroxide solution with efficient stirring. The white, solid resin which was obtained was removed by filtration, washed thoroughly with water, and dried.

Ten grams of the solid resin was dissolved in 40 grams of methyl isobutyl ketone. Two grams of Shell Curing Agent U was added and the solution was poured into a sheet of Teflon to form a film. After evaporation of the solvent, the film was cured at 100° C. for four hours. A hard, glossy film was obtained.

EXAMPLE 4

Epichlorohydrin (200 grams) was added slowly with stirring at 65° C. to a mixture of 1.5 grams of boron trifluoride etherate in 400 grams of polyethylene glycol having an average molecular weight of 400. The addition required thirty minutes and cooling was necessary to maintain the temperature in the range 60 to 70° C. After the addition was complete, the mixture was stirred and kept at 65 to 70° C. for one hour. One hundred and seventeen grams of the reaction product was mixed with 200 grams of methylene chloride and 105 grams of Multrathane F-84, an isocyanate terminated polyether urethane prepolymer containing 6.5 to 7.0 percent NCO. One milliliter of stannous octoate was added and the mixture was kept at 25 to 30° C. overnight. The resulting product was added dropwise with efficient agitation to 240 grams of 10 percent aqueous sodium hydroxide solution at 70 to 75° C. and was allowed to stir for one hour. Four hundred grams of water was added and the lower (organic) layer was separated, washed thoroughly with water, and dried under vacuum. The product contained 1.1 percent oxirane oxygen. It was mixed with 20 percent Epon 828 [1] and cured at 60° C. with diethylenetriamine, aminoethylpiperazine and Shell Curing Agent U. Diethylenetriamine (at a concentration of 1 amino hydrogen per epoxy group) yielded "snappy" rubbers. Amino-

[1] Diglycidyl ether of bisphenol A having a molecular weight of about 350 to 400 sold by Shell Chemical Company.

ethylpiperazine curing afforded rubbers having slow recovery.

Chemical resistance tests

Cured, rubber-like polymers obtained from the products of (1) Example 2 cured with Shell Curing Agent U, and (2) Example 6 cured with diethylenetriamine were compared with a commercial urethane elastomer (3) Seilon UR 80 T (Seiberling Rubber Company) for resistance to hydrolytic degradation. The above samples were heated for sixteen hours, at 70° C. with 10 percent hydrochloric acid. Sample (1) was unchanged in appearance, the acid solution was colorless. Sample (2) was unchanged in appearance, the solution turned yellow. Sample (3), the commercial urethane elastomer, showed definite checking and flaking, the solution turned green. Samples of the three materials were heated with 10 percent hydrochloric acid and also with 10 percent aqueous sodium hydroxide solution for eighty-eight hours at 70° C.

| Sample | (1) 10% HCl | (1) 10% NaOH | (2) 10% HCl | (2) 10% NaOH | (3) 10% HCl | (3) 10% NaOH |
|---|---|---|---|---|---|---|
| Original Wt | 1.4527 | 1.6013 | 1.1193 | 0.9550 | 1.6465 | 1.5483 |
| Final Wt | 1.5638 | 1.6430 | 1.6025 | 1.2020 | 0.8210 | 1.2874 |
| Percent change | +8 | +3 | +43 | +25 | −50 | −17 |

EXAMPLE 5

Poly(epichlorohydrin) (190 grams) having an average molecular weight of 450, was mixed with methylene chloride (300 grams) and p,p'-diphenylmethane diisocyanate (50 grams). One milliliter of stannous octoate was added and the mixture was stirred and kept at 25 to 30° C. overnight under a dry atmosphere. The reaction mixture was then added dropwise, with efficient agitation, to 480 grams of 10 percent aqueous sodium hydroxide solution at 70 to 75° C. and was allowed to stir at this temperature for one hour. Five hundred grams of water was added and the lower (organic) layer was separated, dissolved in toluene, and washed with water. The toluene solution was dried and concentrated in vacuo to give a viscous liquid. Curing with 10 percent diethylenetriamine at 60° C. overnight yielded a flexible polymeric material.

EXAMPLE 6

One milliliter of boron trifluoride-etherate was mixed with trimethylolpropane (45 grams) at a temperature of 65° C. Epichlorohydrin (200 grams) was added dropwise with stirring and with cooling to maintain the temperature in the range of 60° to 65° C. The mixture was stirred for one hour after the addition was complete.

Tolylene diisocyanate (18 grams) was added to a solution of polypropylene glycol (200 grams, approximate molecular weight of 2000) in 150 grams of methylene chloride and 1.5 milliliters of dibutyltin dilaurate was added. The mixture was stirred and allowed to stand for two hours while being protected from atmospheric moisture.

Seventy-five grams of the epichlorohydrin adduct (6/1) of trimethylolpropane was added to the isocyanato polyurethane prepolymer and the mixture was stirred and allowed to stand for sixteen hours.

The reaction mixture was then added dropwise with vigorous agitation to 600 grams of 10 percent aqueous sodium hydroxide solution at a temperature of 65° to 70° C. over a period of one hour. After the addition was completed, the mixture was stirred at 65° to 70° C. for an additional forty-five minutes. The aqueous layer was separated and the viscous residue was washed with water, dissolved in methylene chloride and washed with water containing dissolved $CO_2$ until the pH of the wash water had dropped to 8.0. The methylene chloride solution was dried over anhydrous sodium sulfate, and distilled in vacuo to remove methylene chloride. The viscous, yellow epoxyoxazolidinone which was obtained weighed 145 grams and had an oxirane oxygen content of 1.80 percent.

Curing of the epoxyoxazolidinone

Twenty grams of the epoxyoxazolidinone prepared above was mixed with 5 grams of methylnadic anhydride (National Aniline Division, Allied Chemical and Dye Corporation) and 6 drops of benzyldimethylamine. The mixture was cured at 100° C. for two hours to yield a rubbery material having a Shore Durometer A hardness of 60.

Epoxyoxazolidinone as a plasticizer

Two grams of the epoxyoxazolidinone was dissolved in 5 grams of acetone and added to 20 grams of a solution polymer of 1/1 ethyl acrylate/methyl methacrylate in toluene (33 percent solids). A film formed upon evaporation of the solvent was colorless and transparent and exhibited greater flexibility than a film formed from the 1/1 ethyl acrylate/methyl methacrylate itself.

Epoxyoxazolidinones are also useful as plasticizers for poly(vinyl chloride), and other vinyl halide resin, and for commercial epoxy resins.

The epoxyoxazolidinones have further use as cross-linking agents for acrylic and other polymers containing reactive groups such as —SH, —OH, —COOH, anhydrides or amines to impart toughness, solvent resistance and abrasion resistance to films and coatings.

EXAMPLE 7

Twelve grams of phenylisocyanate was mixed with 41.5 grams of isopropylidene bis [1-(p-phenyleneoxy)-3-chloro-2-propanol], 41.5 grams of methylene chloride and 0.5 cc. of stannous octoate. The mixture was allowed to stand for sixteen hours at room temperature.

Over a period of one hour the resulting solution was added to a mixture of 30 grams of sodium hydroxide (97.8 percent pellets) in 300 grams of dioxane at 70 to 75° C. with stirring. Stirring was continued for an additional one hour period. The reaction mixture was cooled, neutralized with carbon dioxide and filtered. The filtrate was distilled to dryness in vacuo. The epoxyoxyazolidinone product was obtained in the form of a viscous, yellow syrup.

The epoxyoxazolidinone product was polymerized with boron trifluoride etherate and a solid resin was recovered.

EXAMPLE 8

Dioxazolidone diepoxide from polyethylene glycol

Polyethylene glycol having a molecular weight of about 200 (400 g.) and boron trifluoride etherate (0.5 ml.) were placed in a 1000 ml. 3-neck flask; controlling the temperature of the reaction at 85° C. added epichlorohydrin (372 g.) dropwise. After the addition was complete and no further exotherm developed the temperature was raised to 95° C. for 30 minutes. The excess catalyst was neutralized with calcium oxide (12 g.).

*Analysis.*—Theory: Cl, 18.3%; OH, 8.8%. Found: Cl, 17.95%; OH, 9.12%.

To the above dichlorohydrin (385 g.) was added dichloroethane (300 ml.) and stannous octoate catalyst (0.5 ml.) in a 1000 ml. 3-neck flask; with stirring, added tolylene diisocyanate (2,4–2,6) (78.3 g.), controlling the temperature between 5–10° C. for 3 hours and then allowing the temperature to climb to room temperature overnight to form the poly(beta-haloalkylurethano) halohydrin. This condensation product was then treated with sodium hydroxide (88 g.). The reaction temperature was controlled at 70° C. and allowed to run with vigorous stirring for 2½ hours, at which time is was cooled and the excess alkali neutralized with carbon dioxide. The solids were filtered off and the filtrate concentrated to a syrup of the dioxazolidone diepoxide having the following properties:

*Analysis:*—Theory: Cl, 0.0%; oxirane, 3.7%. Found: Cl, 3.7%; oxirane, 3.7%. Viscosity: 4,600 cps. at 25° C.

Physical properties for the blend of the above dioxazolidone diepoxide and Epon 828 with N-aminoethylpiperazine:

Cure cycle 1 week at 22° C.:

3/1 ratio: tensile (p.s.i.) 1300; elongation (percent) 129
2/1 ratio: tensile (p.s.i.) 2600; elongation (percent) 90
1/1 ratio: tensile (p.s.i.) 4550; elongation (percent) 27

1 week at 105° C.:

3/1 ratio: tensile (p.s.i.) 4050; elongation (percent) 151
2/1 ratio: tensile (p.s.i.) 5700; elongation (percent) 105
1/1 ratio: tensile (p.s.i.) 5650; elongation (percent) 8

EXAMPLE 9

Dioxazolidone diepoxide from polypropylene glycol 200

Example 8 is followed with the exception that in place of polyethylene glycol 200, an equal molar amount of polypropylene glycol 200 is employed. The dioxazolidone diepoxide showed:

*Analysis.*—Theory: Cl, 0.0%; oxirane, 5.36%. Found: Cl, 3.5%; oxirane, 3.75%. Viscosity: 11,400 cps. at 25° C. Physical properties: Blend as in Example 8.

Cure cycle 1 week at 22° C.:

3/1 ratio: tensile (p.s.i.) 3150; elongation (percent) 164
2/1 ratio: tensile (p.s.i.) 4450; elongation (percent) 94

1 week at 105° C.:

3/1 ratio: tensile (p.s.i.) 4300; elongation (percent) 27
2/1 ratio: tensile (p.s.i.) 3500; elongation (percent) 8

EXAMPLE 10

Dioxazolidone diepoxide from polypropylene glycol 710 (ml. wt. 775)

Example 8 is followed with the exception that in place of polyethylene glycol 200, an equal molar amount of polypropylene glycol 710 is employed. The dioxazolidone diepoxide had the following properties: Viscosity: 1,400 cps. at 25° C.

EXAMPLE 11

Dioxazolidone diepoxide from polypropylene glycol 1010 (ml. wt. 950)

Example 8 is followed with the exception that in place of polyethylene glycol 200, an equal molar amount of polypropylene glycol 1010 is employed.

*Analysis.*—Theory: Cl, 0.0%; oxirane, 4.0%. Found: Cl, 2.42%; oxirane, 1.30%. Viscosity: 1,400 cps. at 25° C. Physical properties: Blend as in Example 8.

Cure cycle 4 hours at 70° C.:

3/1 ratio: tensile (p.s.i) 100; elongation (percent) 60; shore D 5
2/1 ratio: tensile (p.s.i.) 200; elongation (percent) 35; shore D 6
1/1 ratio: tensile (p.s.i.) 460; elongation (percent) 20; shore D 16

EXAMPLE 12

Dioxazolidone diepoxide from hexane 1,6-diol

Example 8 is followed with the exception that in place of polyethylene glycol 200, an equal molar amount of hexane 1,6-diol is employed.

*Analysis.*—Theory: Cl, 0.0%; oxirane, 5.36%. Found: Cl, 4.38%; oxirane, 3.98%.

EXAMPLE 13

Dichlorohydrin from poly(oxypropylene)glycol and epichlorohydrin

Polypropylene glycol 300 (293 g.), boron trifluoride etherate (0.5 ml.) were placed in a 3-neck round-bottom flask. Controlling the temperature of reaction between 78–80° C. added slowly, epichlorohydrin (194.2 g.).

After addition was completed the temperature was raised to 90° C. for 30 minutes. The excess catalyst was neutralized with calcium oxide (6 g.).

*Analysis.*—Theory: Cl, 14.5%; OH, 7.2%. Found: Cl, 15.4%; OH, 6.81%.

EXAMPLE 14

Di(β-chloromethylurethano) dichlorohydrin (A) Dichlorohydrin (of Example 13) (129 g.), dichloroethane (130 ml.) and stannous octoate catalyst (0.1 ml.) were placed in a 3-neck round-bottom flask. With stirring, added tolylene diisocyanate (2,4–2,6) (19.14 g.) controlling the temperature between 5–10° C. The temperature was allowed to come to room temperature overnight.

*Analysis.*—Theory: Cl, 12.9%; OH, 5.8%. Found: Cl, 13.9%; OH, 5.38%. Viscosity: 3,750 cps. at 25° C.

(B) Dichlorohydrin (of Example 13) (129 g.), tolylene diisocyanate (2,4–2,6) (19.14 g.) were placed in a 3-neck round-bottom flask and with stirring, heated at 100° C. for 5 hours.

*Analysis.*—Found: Cl, 13%; OH, 3.57%; N, 2.54%.

EXAMPLE 15

Dioxazolidone diepoxide (A) To the di(β-chloromethylurethano) dichlorohydrin [of Example 14(A)] in dichloroethane was added sodium hydroxide. The temperature was controlled between 70–80° C. and allowed to stir for 2 hours, at which time the mixture was cooled and the excess alkali neutralized with carbon dioxide. The solids were filtered off and the filtrate concentrated to an amber syrup.

*Analysis.*—Found: Cl, 2.6%; oxirane, 3.5%. Viscosity: 4,070 cps. at 25° C. $n_D^{25}$=1.4868. Physical properties: Blend as in Example 8.

Cure cycle 1 week at 22° C.

2/1 ratio (of dioxazolidone diepoxide to Epon 828): tensile (p.s.i.) 2,800; elongation (percent) 162.5; Shore D, 50; water resistance, 10.3%

Electrical

Capacitance:
  1 kc. ---------------------------------- 16.75
  100 kc. --------------------------------- 14.38
Dielectric constant:
  1 kc. ---------------------------------- 4.13
  100 kc. --------------------------------- 3.54
Dissipation factor:
  1 kc. ---------------------------------- 0.046
  100 kc. --------------------------------- 0.040

Cure cycle 1 week at 105° C.

2/1 ratio: tensile (p.s.i.) 4350; elongation (percent) 145; Shore D, 67; water resistance, 16.1%

Electrical

Capacitance:
  1 kc. ---------------------------------- 15.84
  100 kc. --------------------------------- 14.18
Dielectric constant:
  1 kc. ---------------------------------- 3.94
  100 kc. --------------------------------- 3.52
Dissipation factor:
  1 kc. ---------------------------------- 0.032
  100 kc. --------------------------------- 0.028

(B) The di(β-chloromethylurenthano) dichlorohydrin [of Example 14(B)] in dichloroethane was treated the same as in Example 15(A).

*Analysis.*—Found: Cl, 2.9% oxirane, 3.5%. Viscosity: 4,340 cps. at 25°.; $n_D^{25}$ 1.4870. Physical properties: Blend as in Example 8.

Cure cycle 1 week at 22° C.

2/1 ratio: tensile (p.s.i.) 3300; elongation (percent) 150; Shore D, water resistance, 13.2%

Electrical

Capacitance:
  1 kc. ---------------------------------- 17.73
  100 kc. --------------------------------- 15.59
Dielectric constant:
  1 kc. ---------------------------------- 4.02
  100 kc. --------------------------------- 3.53
Dissipation factor:
  1 kc. ---------------------------------- 0.034
  100 kc. --------------------------------- 0.038

Cure cycle 1 week at 105° C.

2/1 ratio: tensile (p.s.i.) 3850; elongation (percent) 106.5; Shore D, 72; water resistance, 18.1%

Electrical

Capacitance:
  1 kc. ---------------------------------- 16.17
  100 kc. --------------------------------- 14.55
Dielectric constant:
  1 kc. ---------------------------------- 3.86
  100 kc. --------------------------------- 3.48
Dissipation factor
  1 kc. ---------------------------------- 0.027
  100 kc. --------------------------------- 0.028

EXAMPLE 16

Dioxazolidone tetra-epoxide from triol 740 (M.W. 732)

Triol 740 [1] (732 g.) (1 M) and boron trifluoride etherate (0.5 ml.) were placed in a 3-neck round-bottom flask. Epichlorohydrin (370 g.) (4 M) was slowly added, controlling the temperature at 80° C. The excess catalyst was neutralized by calcium oxide. To 888 g. of this mixture was added dichloroethane (600 ml.) and stannous octoate catalyst (0.5 ml.). With stirring added tolylene diisocyanate (55.6 g.) (0.32 M), controlling the temperature between 5–10° C. and allowing the temperature to climb to room temperature overnight. The mixture was then treated with sodium hydroxide (105 g.) and the temperature controlled between 70–80° C. Cooled the reaction and neutralized the excess alkali with carbon dioxide. Filtered and removed solvent.

*Analysis.*—Found: Cl. 2.9%; oxirane, 2.7%. Viscosity: 1,876 cps. at 25° C. Physical properties: Blend as in Example 8.

Cure cycle 1 week at 25° C.

3/1 ratio: tensile (p.s.i.) 400; elongation (percent) 66; Shore A, 67

2/1 ratio: tensile (p.s.i.) 1000; elongation (percent) 82; Shore D, 25

1/1 ratio: tensile (p.s.i.) 3150; elongation (percent) 55; Shore D, 59

Cure cycle 1 week at 105° C.

3/1 ratio. tensile (p.s.i.) 640; elongation (percent) 82; Shore D, 22

2/1 ratio: tensile (p.s.i.) 2000; elongation (percent) 89; Shore D, 36

1/1 ratio: tensile (p.s.i.) 4200; elongation (percent) 27; Shore D, 70

[1] Triol 740: trimethylolpropane-propylene oxide condensates of approximately 700 molecular weight.

EXAMPLE 17

Dioxazolidone tetra-epoxide from triol 4542 (M.W. ca. 4500)

Triol 4542[1] (1125 g.) (0.25 M) and boron trifluoride etherate were placed in a 3-week round-bottom flask. Epichlorohydrin (92.5 g.) (1 M) was added, controlling the temperature at 80° C. The excess acid was then neutralized by adding calcium oxide. To the mixture (1137 g.) was added dichloroethane (900 ml.), stannous octoate catalyst (0.4 ml.) and tolylene diisocyanate (2,4–2,6) (19.01 g.) (0.11 M). After condensation was complete to form di(beta-chloro-methylurethano) tetrachlorohydrin the reaction mixture was treated with sodium hydroxide (30.3 g.), controlling the temperature between 70–80° C. to dehydrohalogenate the urethano intermediate. Cooled reaction and neutralized excess alkali with carbon dioxide. Filtered and removed solvent. The dioxazolidone tetraepoxide had the following properties:

*Analysis.*—Found: Cl, 2.31%; oxirane, 0.57%. Viscosity: 2,400 cps. at 25° C.

EXAMPLE 18

Ethyl isocyanate (0.1 mole, 7.1 g.) was mixed with isopropylidene bis [1-(p-phenyleneoxy)-3-choloro-2-propanol] (41.5 g., 0.1 mole), 42 g. ethylene dichloride and 0.5 ml. stannous octoate. The mixture was allowed to stand overnight at room temperature to form the (beta-chloroalkylurethano) chlorohydrin. The mixture was then diluted with 150 ml. ethylene dichloride. At 70–75° C., over a period of 30 minutes, 16 g. (0.4 mole) of sodium hydroxide flakes was added portion-wise with stirring. Stirring was continued for an additional hour period. The reaction mixture was cooled, neutralized with carbon dioxide and filtered. Upon concentration to dryness in vacuo the epoxy oxazolidinone was obtained in the form of a viscous, yellow syrup. Upon polymerization with boron trifluoride etherate, a solid resin was recovered.

EXAMPLE 19

Isopropyl isocyanate (0.1 mole, 8.5 g.) was mixed with 115.0 g. (0.1 mole) of polyepichlorohydrin 1150 (a dichlorohydrin from the Dow Chemical Company) 120 ml. of ethylene dichloride and 0.5 ml. stannous octoate. The mixture was allowed to stand overnight at room temperature to form the (beta-chloroalkylurethano) chlorohydrin. The mixture was then diluted with 110 ml. ethylene dichloride. At 770–75° C., over a period of 30 minutes, 16 g. (0.4 mole) of sodium hydroxide flakes was added portion-wise with stirring. By continuing the procedure of Example 18, a viscous syrupy product was obtained. The epoxy oxazolidinone product was polymerized with boron trifluoride etherate and a solid resin was recovered.

EXAMPLE 20

Dodecyl isocyanate (0.1 mole, 21.1 g.) was mixed with isopropylidene bis[1-(p-phenyleneoxy)-3-chloro-2-propanol] (41.5 g., 0.1 mole), 75 g. ethylene dichloride and 0.5 ml. stannous octoate. The mixture was allowed to stand overnight at room temperature to form the (beta-chloroalkylurethano) chlorohydrin. The mixture was then diluted with 150 ml. ethylene dichloride. At 70–75° C., over a period of 30 minutes, 16 g. (0.4 mole) of sodium hydroxide flakes was added portion-wise with stirring. By continuing the procedure, as in Example 18, a viscous syrupy product was obtained. The epoxy oxazolidinone product was polymerized with boron trifluoride etherate and a solid resin was recovered.

EXAMPLE 21

α-Naphthyl isocyanate (0.1 mole, 16.9 g.) was mixed with 1,4-di(3-chloro-2-ol-propyloxy)butane (27.5 g., 0.1 mole), 40 ml. of ethylene dichloride and 0.5 ml. stannous octoate. The mixture was allowed to stand overnight at room temperature to form the (beta-chloroalkylurethano) chlorohydrin. It was then diluted with 110 ml. of ethylene dichloride. At 70–75° C. 16 g. (0.4 mole) of sodium hydroxide flakes was added as in Example 18. By continuing the procedure of Example 18 a viscous amber syrup was obtained. Again a solid resin was recovered after polymerization of the epoxy oxazolidinone product with boron trifluoride.

EXAMPLE 22

A monoisocyanate was prepared by treating 17.4 g. (0.1 mole) of tolylene diisocyanate (80% 2,4; 20% 2,6) with 13.0 g. (0.1 mole) of 1-octanol in 100 ml. ethylene dichloride in the presence of 0.2 ml. stannous octoate for 4 hours at room temperature, then at 3 hours at 40° C. Isopropylidene bis[1-(p-phenyleneoxy)-3-chloro-2-propanol] (41.5 g., 0.1 mole) and 0.4 ml. stannous octoate were added; the mixture was then allowed to stand overnight at room temperature to form the (beta-chloroalkylurethano) halohydrin. At 70–75° C., 16 g. (0.4 mole) of sodium hydroxide flakes was added as in Example 18. By following the procedure of Example 18 a viscous syrupy product was obtained. Again, a solid resin was recovered after polymerization of the epoxy-oxazolidinone product with boron trifluoride.

In the preceding examples, tensile strength was measured in accordance with ASTM 638–52TD and recorded as pounds per square inch (p.s.i.) whereas the tests on electrical properties were measured in accordance with ASTM D–150–59T and ASTM D–150–54T.

As stated hereinbefore, the novel compounds of this invention include those prepared from a monoisocyanate (instead of a polyisocyanate) and a di(halohydrin). Also, other poly(halohydrins) can be employed in place of a di(halohydrin) in the reaction with a monoisocyanate. The poly(halohydrins) mentioned hereinbefore can be employed in preparing such compounds. The monoisocyanate reactant can be of the types mentioned hereinbefore for polyisocyanates, e.g. a compound of Formula I wherein $x$ is 1 and R is a monovalent aromatic or aliphatic group, e.g. alkyl, aryl, etc. These (beta-haloalkylurethano) halohydrin compounds can be represented by the formula:

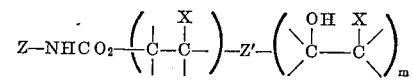

wherein Z is selected from aliphatic and aromatic structures consisting of alkyl, substituted alkyl, alkyloxy, alkenyl, substituted alkenyl, aryl, and substituted aryl; Z' is selected from aliphatic and aromatic structures consisting of alkylene, substituted alkylene, alkyleneoxy, cycloalkylene, substituted cycloalkylene, arylene, substituted arylene, aralkylene and substituted aralkylene, and Z' can also be a covalent bond; X is halogen; and $m$ is an integer from 1 to 5. Preferably Z is hydrocarbyl having from about 6 to 12 carbon atoms, e.g. alkyl, alkphenyl, and the like; X is chlorine or bromine and particularly chlorine; $m$ is 1; and Z' represents the preferred Z' groups for the poly(beta-haloalkylurethano) halohydrin compounds.

In preparing preferred compositions of this invention, the major quantity of poly(beta-haloalkylurethano)halohydrin compounds have a structure as shown in Formula III. However, isomeric compounds are coproduced wherein the halohydrin has a terminal hydroxy group instead of a terminal halogen and the beta-carbon atom carrying the halogen is directly attached to Z', e.g. as possible in Formula II, instead of being part of a side chain

---

[1] Triol 4542: trimethylolpropanepropylene oxide condensates of approximately 4500 molecular weight.

as shown in Formula III. Such isomeric compounds are illustrated by the formula:

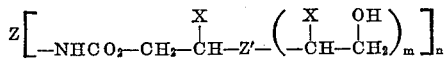

wherein Z, X, Z', m and n have the same meaning as in Formula III.

What is claimed is:

1. A class of (beta-haloalkylurethano)halohydrin compounds, in the liquid state, of the formula:

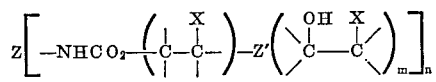

wherein Z is a polyvalent organic radical selected from aromatic and aliphatic radicals consisting of hydrocarbon phenylene or naphthalene aromatics or hydrocarbon aliphatic groups, said aromatic and aliphatic groups being substantially free of olefinic and acetylenic unsaturation; Z' is a covalent bond, and when not a covalent bond, an aliphatic or aromatic radical selected from groups consisting of alkylene, alkyleneoxy, phenyleneoxy, chloropropyleneoxy, cyclohexylene, phenylene or naphthalene arylenes; X is chlorine or bromine, m is an integer between 1 and 5; and n is an integer between 2 and 10; and wherein the available valences are satisfied by hydrogen atoms.

2. A compound of claim 1 wherein Z is tolylene and X is chlorine.

3. A poly(beta-haloalkylurethano) halohydrin compound, in the liquid state, of the formula:

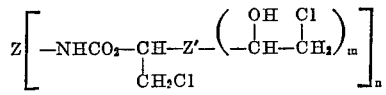

wherein Z is a divalent hydrocarbon having from 6 to 12 carbon atoms; X is chlorine or bromine; m is 1; n is 2; Z' is the organic residue of a di(chlorohydrin) or di(bromohydrin); said compound having a molecular weight of not greater than 5,000.

4. A compound of claim 3 wherein Z is tolylene.

5. A compound of claim 4 wherein Z' is the group —CH$_2$—(OR)$_n^1$—O—CH$_2$— and R is alkylene of 2 to 4 carbon atoms, $n^1$ is an integer representing repeating units of (OR).

6. A compound of claim 5 wherein R is propylene.

7. A compound of claim 1 wherein Z is a divalent hydrocarbon selected from structures consisting of alkylene and phenylene or naphthalene aromatics; Z' is a divalent group selected from structures consisting of alkylene, alkyleneoxy, cyclohexylene, phenylene or naphthalene arylenes, and when not one of the above Z' can be a covalent bond; X is chlorine; m is 1; and n is 2.

8. A class of (beta-haloalkylurethano) halohydrin compounds, in the liquid state, of the formula:

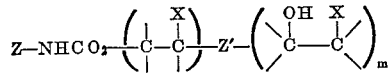

wherein Z consists of groups selected from alkyl, alkyloxy, hydrocarbon phenylene or naphthalene aromatics; Z' is a covalent bond, and when not a covalent bond it is selected from groups consisting of alkylene, alkyleneoxy, cyclohexylene, phenylene or naphthalene arylenes; X is chlorine or bromine; and m is 1; and wherein the available valences are satisfied by hydrogen atoms.

9. A poly (beta-haloalkylurethano) halohydrin compound, in the liquid state, of the formula:

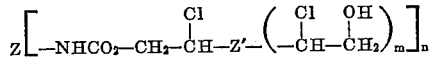

wherein Z is a divalent hydrocarbon having from 6 to 12 carbon atoms; m is 1; n is 2; and Z' is the organic residue of a di(chlorohydrin) or di(bromohydrin); said compound having a molecular weight of not greater than 5,000.

10. A compound of claim 9 wherein Z is tolylene; and Z' is the group

—CH$_2$—(OR)$_n^1$—O—CH$_2$— wherein R is alkylene of 2 to 4 carbon atoms and $n^1$ is an integer representing repeating units of (OR).

11. A process of producing poly(beta-haloalkylurethano) halohydrin compounds, in the liquid state, wherein said halo groups are chlorine or bromine, which comprises reacting a polyisocyanate with a poly(halohydrin), wherein said poly(halohydrin) is a poly(chlorohydrin) or a poly(bromohydrin) in quantities providing between about 1.5 and 2.5 of said halohydrin groups per isocyanato group, said poly(beta-haloalkylurethano) halohydrin being in the liquid state.

12. The process of claim 11 wherein the polyisocyanate is tolylene diisocyanate and the poly(halohydrin) is poly(epichlorohydrin) in quantities providing about 2 halohydrin groups per isocyanato group.

13. The process of claim 11 wherein the polyisocyanate is an isocyanato prepolymer prepared from tolylene diisocyanate and polypropylene glycol, and the poly(halohydrin) is isopropylidene bis[1-(p-phenyleneoxy(-3-chloro-2-propanol].

14. The process of claim 11 wherein the polyisocyanate is an isocyanato polyurethane prepolymer, and the poly(halohydrin) is the reaction product of epichlorohydrin with polyethylene glycol.

15. The process of claim 11 wherein the polyisocyanate is tolylene diisocyanate and the poly(halohydrin) is the reaction product of epichlorohydrin with a trimethylolpropane.

16. The process of claim 11 wherein the polyisocyanate is tolylene diisocyanate and the poly(halohydrin) is the reaction product of epichlorohydrin and a poly(oxyalkylene) glycol having from 2 to 4 carbon atoms in each alkylene group and wherein the tolylene diisocyanate is reacted with said reaction product of epichlorohydrin in quantities providing between 1.5 and 2.5 halohydrin group per isocyanato group.

17. The process of claim 16 wherein the poly(oxyalkylene) glycol has a molecular weight of from about 150 to 1,000 and said reaction product of epichlorohydrin and poly(oxyalkylene) glycol is of the formula:

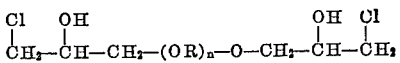

wherein R is alkylene having from 2 to 4 carbon atoms and n represents repeating units of said oxyalkylene group.

18. A process of claim 17 wherein R is propylene.

19. A process of producing (beta-haloalkylurethano) halohydrin compounds, in the liquid state, which comprises reacting a monoisocyanate with a di(halohydrin), said di(halohydrin) being a di(chlorohydrin) or a di(bromohydrin) in quantities providing about 2 chlorohydrin or bromohydrin groups per isocyanato group.

20. The process of claim 19 wherein the monoisocyanate is phenylisocyanate and the di(halohydrin) is isopropylidene bis[1-(p-phenyleneoxy)-3-chloro-2-propanol].

References Cited

UNITED STATES PATENTS 3,255,126    6/1966    Fuzesi et al. _____ 260—77.5

LORRAINE A. WEINBERGER, *Primary Examiner.*

L. A. THAXTON, *Assistant Examiner.*

U.S. Cl. X.R.

260—77.5, 307, 468, 470, 481, 482